United States Patent [19]

Schmitz et al.

[11] Patent Number: 4,805,430
[45] Date of Patent: Feb. 21, 1989

[54] TOOL FOR COLD FORGING TUBULAR MEMBERS

[75] Inventors: Thomas R. Schmitz, Katy; Arthur H. T. Chin, Houston, both of Tex.

[73] Assignee: Cameron Iron Works USA, Inc., Houston, Tex.

[21] Appl. No.: 106,803

[22] Filed: Oct. 13, 1987

[51] Int. Cl.$^4$ .................... B21D 26/02; B21D 39/20
[52] U.S. Cl. .......................................... 72/58; 29/523
[58] Field of Search ................ 72/58, 60–63; 29/507, 421 R, 523

[56] References Cited

U.S. PATENT DOCUMENTS

| | | | |
|---|---|---|---|
| 3,627,336 | 12/1971 | Lawson | 72/61 |
| 4,006,619 | 2/1977 | Anderson | 72/58 |
| 4,343,170 | 8/1982 | Hufton | 29/421 R |
| 4,608,739 | 9/1986 | Miller | 29/421 R |
| 4,724,693 | 2/1988 | Tedder | 29/421 R |

FOREIGN PATENT DOCUMENTS 0177045  4/1986  European Pat. Off. ............. 29/523

*Primary Examiner*—Lowell A. Larson
*Attorney, Agent, or Firm*—Vinson & Elkins

[57] ABSTRACT

An improved cold forging tool to exert radial forces outwardly within a tubular member to forge it into an annular member having a central body with a shoulder on its exterior at both ends and support connecting into one end, a resilient sleeve surrounding the central body, a passage through the central body to communicate between a pressure supply connected to the end of the body and the interior of the resilient sleeve, a support ring surrounding each end of the resilient sleeve and a segmented ring positioned between the central expansion portion of the resilient sleeve and each of the support rings with resilient ring retaining the segmented ring in surrounding relationship to the ends of the resilient sleeve to prevent extrusion of the resilient sleeve during forming of the tubular member. In one form of the tool the resilient packer sleeve is molded on the central body.

9 Claims, 6 Drawing Sheets

TOOL FOR COLD FORGING TUBULAR MEMBERS

BACKGROUND

The cold forging of a tubular member into an annular member such as a well hanger or a connector has been known in the past. The cold forging has also been used to form a tubular member into an annular connector in a remote location, such as in a subsea pipeline repair. This is shown in U.S. Pat. Nos. 3,432,916 and 4,330,144. U.S. Pat. No. 4,662,663 discloses the use of pressure compensating material between the two members being cold formed and such material prevents the buildup of pressure which would prevent the proper completion of the cold forming.

A tool previously used in this type of cold forging process is shown in U.S. Pat. No. 4,388,752. This tool includes an alloy shaft having a shoulder on one end and a ring surrounding the other end and a rubber tube expansion element surrounding the shaft with annular nylon rings engaging the ends of the rubber expansion element and alloy rings supporting the exterior of each of the nylon rings. The radial force is developed by the tool response to longitudinal forced exerted on the expansion element. The nylon rings are provided to prevent extrusion of the rubber expansion element.

Other tools have been suggested which include a resilient tubular member which is exposed to hydraulic pressure internally and secured at its ends and is allowed to exert outward radial forces to cold forge a tubular member into the interior of an annular member.

SUMMARY

The present invention relates to an improved cold forging tool to exert radial forces outwardly to form a tubular member outwardly into an annular member. The improved tool includes a central body having a shoulder means on its exterior at both ends and support means connecting into one end, a resilient sleeve surrounding said central body, a passage through the central body to communicate between a pressure supply means connected to the end of the body and the interior of said resilient sleeve, a support ring surrounding each end of said resilient sleeve and a segmented ring positioned between the central expansion portion of said resilient sleeve and each of said support rings and resilient means retaining said segmented ring in surrounding relationship to the ends of said resilient sleeve to prevent extrusion of the resilient sleeve during the forming of the tubular member.

An object of the present invention is to provide an improved tool for cold forging a tubular member within an annular member which reliably prevents extrusion of the resilient sleeve even when forging high strength tubular steel members.

Another object is to provide an improved cold forging tool having an extended life.

A further object is to provide an improved cold forging tool which does not require that the resilient sleeve be molded onto the tool during manufacture.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 1:
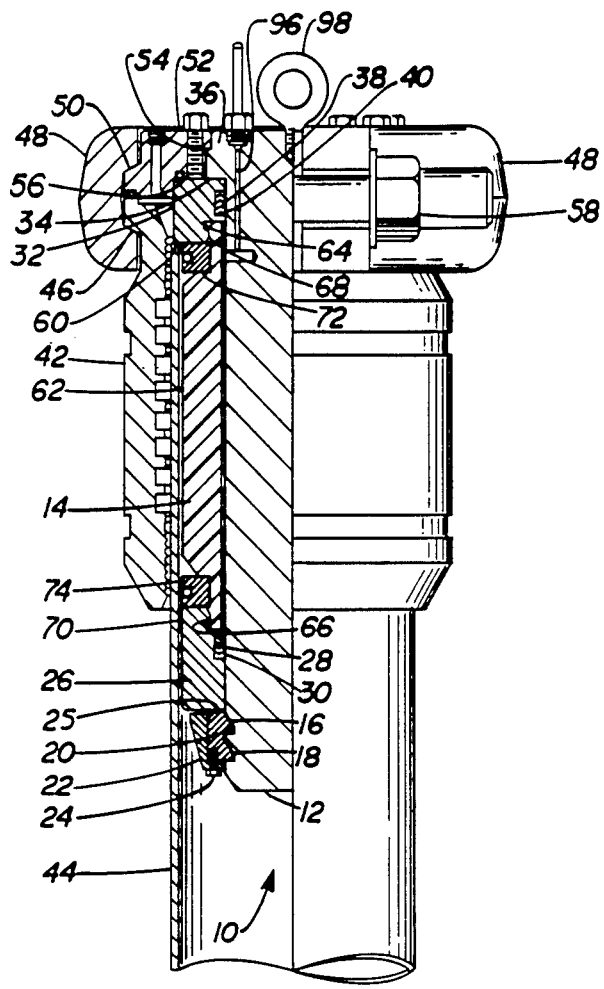
FIG. 1 is an elevation view partly in section of the tool of the present invention having a tubular member to be cold forged positioned in surrounding relationship thereto and with the annular member into which the tubular member is to be forged being connected to the tool and in surrounding relationship to the tubular member and the tool.

Improved cold forging tool 10 of the present invention, as best seen in FIG. 1, includes the central body or mandrel 12 with packer assembly 14 being positioned therearound. Segments 16 have internal teeth 18 which engage within grooves 20 around the lower exterior of body 12 and retainer ring 22 is secured to segments 16 by screws 24 to retain them in position within grooves 20 to provide a lower body shoulder 25 in supporting relationship to lower packer support ring 26. Annular recess 28 around the interior of packer support ring 26 has seal ring 30 positioned therein to seal against the exterior of body 12. Packer assembly 14 is positioned between lower packer support ring 26 and upper packer support ring 32. Upper packer support ring 32 is positioned around the upper end of body 12 in engagement with shoulder 34 formed on the outwardly extending flange 36 of body 12. Annular recess 38 on upper packer support ring 32 has seal ring 40 positioned therein for sealing between the exterior of body 12 and the interior of support ring 32.

Annular member 42 into which tubular member 44 is to be cold forged includes upper outer clamping shoulder 46 which is engaged by clamps 48 as is shoulder 50 on the upper exterior of clamp ring 52 which is supported on upwardly facing annular shoulder 54 of the flange portion of tool 12. Upper packer support ring 32 engages downwardly facing shoulder 34 and also downwardly facing shoulder 56 on clamp ring 52. Clamps 48 are held in clamping engagement around shoulders 46 and 50 by bolts 58.

Figure 2:
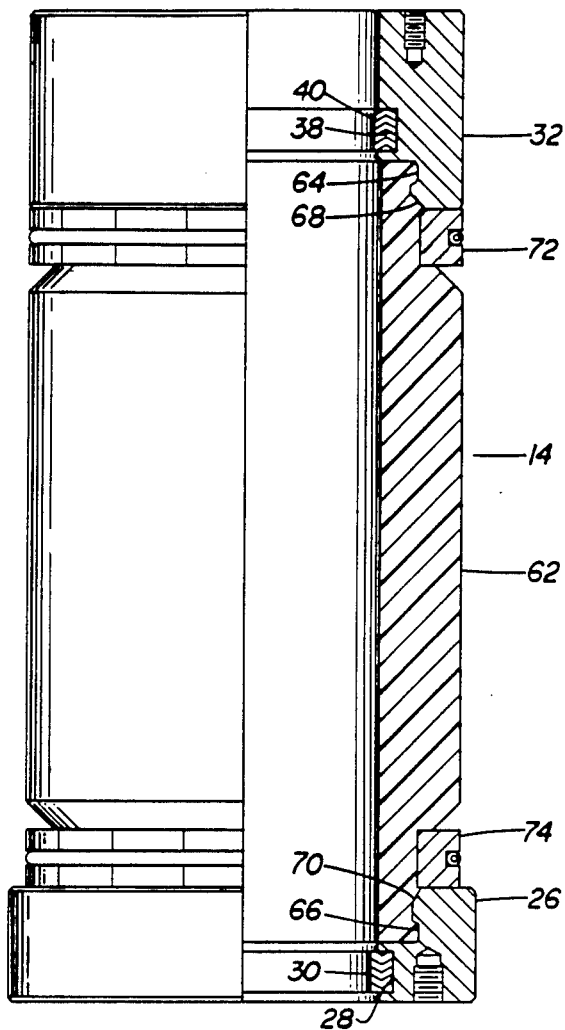
FIG. 2 is a similar view of the improved packer assembly used with the improved cold forging tool of the present invention.

As shown in FIG. 1, tool 10, with annular member 42 supported thereon, is lowered into the desired position with respect to tubular member 44. The upper end of tubular member 44 is in engagement with the lower shoulder 60 on upper support ring 32. Resilient packer sleeve 62 is mounted around mandrel 12 and has its upper and lower ends positioned within recesses 64 and 66 between extensions 68 and 70 on packer support rings 32 and 26. As best seen in FIG. 2 recesses 64 and 66 are undercut to provide a better engagement of the ends of packer sleeve 62. Anti-extrusion rings 72 and 74 are positioned in surrounding relations to packer sleeve 62 immediately above lower packer support ring 26 and immediately below upper packer support ring 32. Anti-extrusion rings 72 and 74 are substantially the same in construction and as best seen in FIGS. 4 to 7, each includes a plurality of segments 76 having an outer annular recess 78 in which annular coil spring 80 or other suitable resilient means which urges segments 76 radially inwardly.

Figure 3:
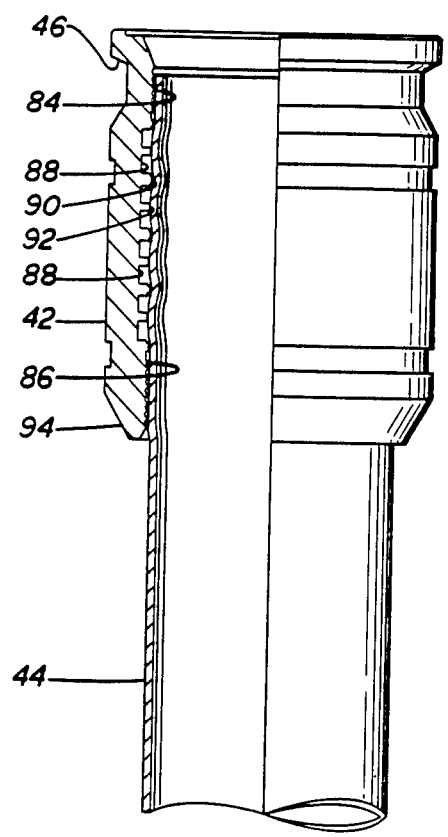
FIG. 3 is another similar view of the tubular member which has been cold forged into the annular member.

Annular member 42, as shown in FIG. 3, which could be a casing housing includes inner upper lightly threaded or fine toothed surface 84, inner lower lightly threaded or fine toothed surface 86 and a plurality of internal grooves 88 having inwardly projecting lands 90 and 92 alternating in position between the grooves 88 and lands 90 including inwardly directed sharpened corners and projecting inwardly a greater distance than the lands 92. The exterior surface of annular member 42 is configured for the application which it is to fill and may have external grooves and a lower tapered seating surface 94.

In order to provide pressure to the interior of packer sleeve 62, fluid under pressure is delivered to port 96 in the upper end of body 12 which communicates with the exterior of body 12 between seal rings 30 and 40. Fluid pressure is then exerted on the interior of packer sleeve 62 and forces it radially outward with sufficient force to cold forge tubular member 44 into tight gripping engagement with the interior of annular member 42. Eye 98 is threaded into the upper end of body 12 to raise and lower tool 10 in a well bore.

Figure 4:
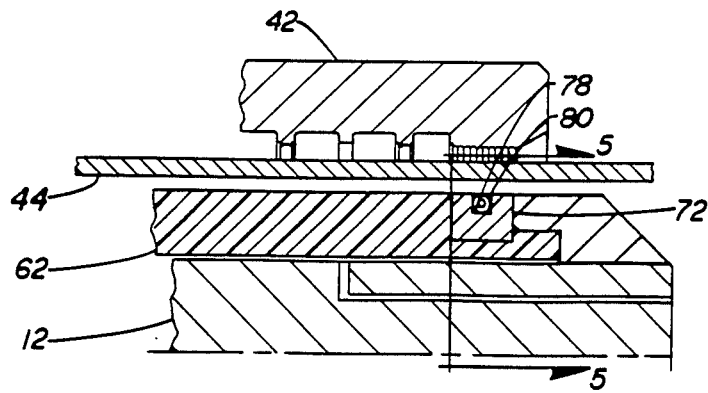
FIG. 4 is a partial detail sectional view of the improved tool in its relaxed position with the tubular member and the annular member being shown.
Figure 5:
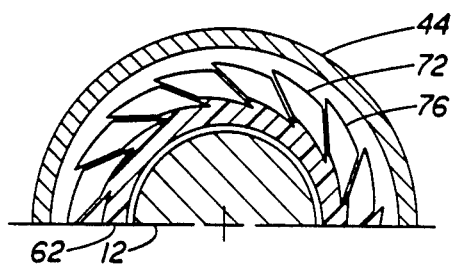
FIG. 5 is a sectional view taken along line 5—5 in FIG. 4.
Figure 6:
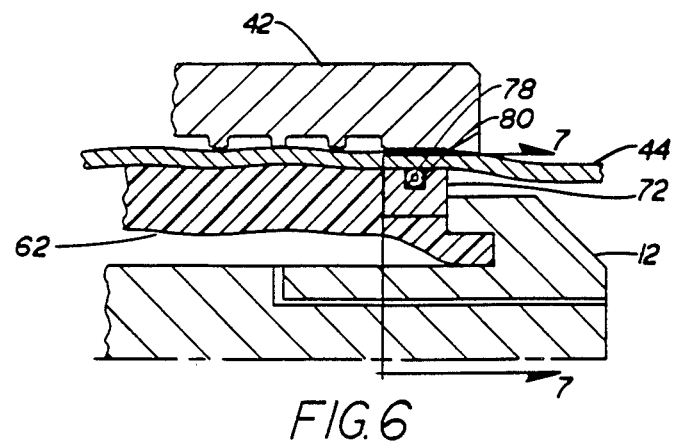
FIG. 6 is a partial detail sectional view of the improved tool in its forming position with the tubular member and the annular member being shown.
Figure 7:
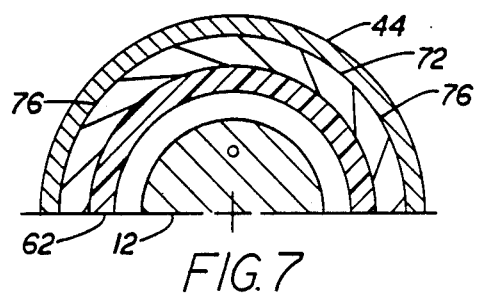
FIG. 7 is a sectional view taken along line 7—7 in FIG. 6.

Anti-extrusion ring 72 is illustrated in FIGS. 4 to 7 and is illustrative of ring 74 as well since both rings have the same design. Segments 76 are formed by cutting them from a metal ring having an external diameter which is substantially the diameter of the interior of tubular member 44 after it has been formed as shown in FIGS. 6 and 7. Segments 76 are cut preferably in a straight line which is at an angle to a tangent at the point of entry of the cut into the outer surface of the metal ring. It is preferred that an angle of cut which is approximately forty degrees to the tangent provides satisfactory segments. The inside diameter of the metal ring before cutting of the segments should be substantially smaller than the outer diameters of support rings 26 and 32. The exterior surface of the metal ring from which segments 76 are cut includes an annular groove which forms recesses 78 in the exterior surface of segments 76.

When segments 76 are assembled into ring 72 in surrounding relationship to the exterior end portion of packer sleeve 62 in its relaxed position as shown in FIGS. 4 and 5, they are urged inward by coil spring 80, which is positioned within recesses 78 in the exterior surfaces of segments 76 to cause them to cant and have their inner tapered ends engaging tightly into the exterior of packer sleeve 62 as best seen in FIG. 5. When pressure is applied between the exterior of body or mandrel 12 and the interior of packer sleeve 62, packer sleeve 62 is moved radially outward and anti-extrusion rings move outward therewith until the exterior of segments 76 come into engagement with the interior of tubular member 44 as shown in FIGS. 6 and 7. The exterior of segments 76 remain in engagement with the interior of tubular member 44 and thus avoid the occurrence of minor gaps between the exterior of rings 72 and 74 and the interior of tubular member 44. This prevents the extrusion of packer sleeve 62 into gaps and thereby protects the integrity of packer sleeve 62 so that it will have a longer life. The use of the springs 80 provides a biasing force urging the segments inwardly and when no pressure is being exerted on the packer sleeve 62, they are fully retracted by the springs 80 so that they do not interfere with the positioning of the forging tool 10 within the tubular member 44 that is to be formed. Also the springs 80 resist the outward movement of packer sleeve 62 during forming to maintain each of segments 76 in relatively the same radial position as all of the other segments 76 so that they move outward uniformly until they are in engagement with the interior of tubular member 44.

Figure 8:
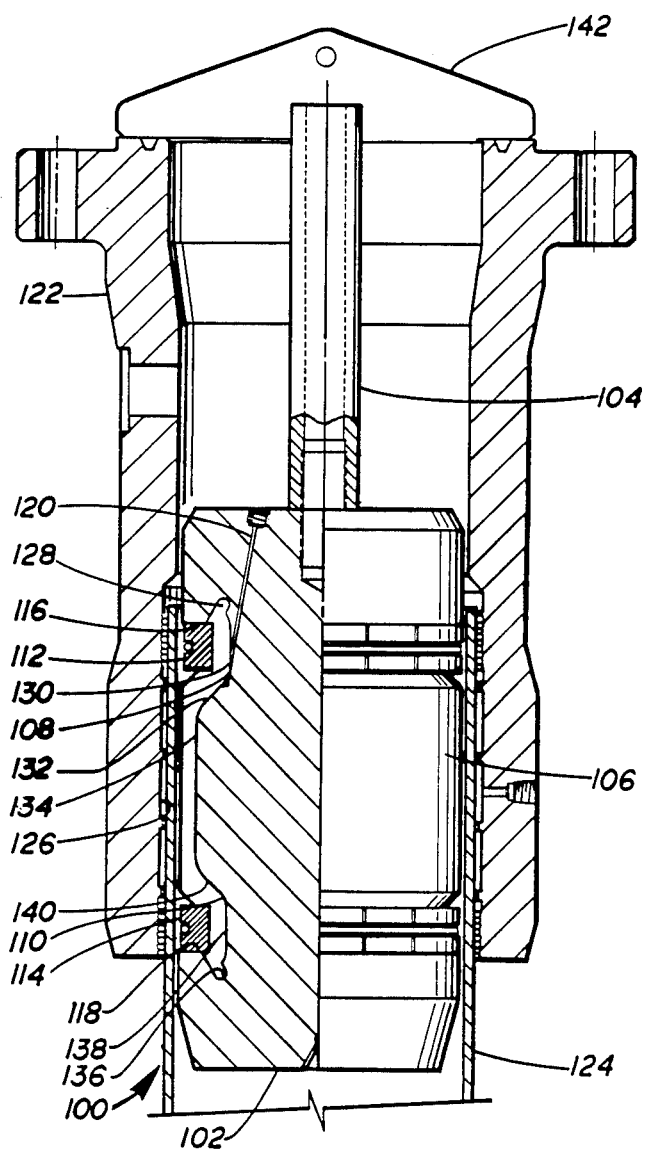
FIG. 8 is a sectional view of another embodiment of the improved tool of the present invention in which the body or mandrel include the resilient packer integrally molded therein.

The other form of improved forging tool 100 of the present invention is illustrated in FIG. 8. Tool 100 includes body or mandrel 102 which is supported on running string 104 and has packer 106 integrally molded therein into recesses 108 and 110 with suitable anti-extrusion rings 112 and 114 being position in surrounding relationship to the ends of packer 106 and in abutting relationship to upper shoulder 116 and lower shoulder 118 on body 102. Suitable port, such as passageway 120, is provided in body 102 through which fluid under pressure is delivered to the interior of packer 106 so that it may perform its forging task as hereinafter described.

In FIG. 8, tool 100 into the well bore with housing 122 with tool 100 supported thereon when in the desired position with respect to tubular member 124 as shown, tool 100 is ready to be pressurized with fluid under pressure so that packer 106 expands within tubular member 124 and forces it into tight sealing and gripping engagement with the interior recess 126 of housing 122. Anti-extrusion rings 112 and 114 are moved radially outward with the radial expansion of packer 106 while maintaining their engagement with shoulders 116 and 118 and engage the interior surface of tubular member 124 to prevent the extrusion of packer 106 during the forging of tubular member 124 into the interior of housing 122.

Recess 108 within body is shaped as shown with an inwardly and upwardly extending portion 128 immediately under shoulder 116 and its surface 130 is generally cylindrical in shape at a position within upper anti-extrusion ring 112. Surface 130 extends to tapered surface 132 which extends downwardly and outwardly to cylindrical surface 134. Lower recess 110 is similar in shape to recess 108 but is the mirror image thereof with portion 136 extending downwardly and inwardly immediately under shoulder 118 and its surface 138 being generally cylindrical in shape at a position within lower anti-extrusion ring 114. Surface 138 extends upward to tapered surface 140 which extends upwardly and outwardly to cylindrical surface 134. This shape allows packer 106 to be molded into recesses 108 and 110 and with the installation of anti-extrusion rings 112 and 114 and the connection of running string 104, tool 100 is ready for running and forging of tubular member 124 into recess 126 of housing 122. It is believed that the shape of packer 106 within its recesses 108 and 110 together with anti-extrusion rings 112 and 114 causes packer 106 to be retained within its recesses 108 and 110 when fluid under pressure is delivered to the interior of packer 106.

String 104 is connected to plate 142 which engages the upper end of housing 122. This positions tool 100 in its desired forging position with respect to housing recess 126. Also, a connection from a source of pressure fluid (not shown) would extend to passageway 120 to provide the forging pressure for the operation of tool 100.

What is claimed is:

1. A tool for forging tubular members comprising a cylindrical body having a passage extending from its upper end and exiting at an intermediate position on its outer surface, an upwardly facing shoulder surrounding the lower portion of said body, a downwardly facing upper shoulder surrounding the upper portion of said body, a packer assembly surrounding said body between said shoulders and including a resilient sleeve, an upper anti-extrusion ring surrounding the upper end of said resilient sleeve below said downwardly facing upper shoulder, a lower anti-extrusion ring surrounding the lower end of said resilient sleeve above said upwardly facing shoulder, each of said rings including a plurality of segments and means urging said segments radially inward, each of said segments being formed as though they were cut from a metal ring having an outer diameter which is substantially the same as the maximum diameter to which said segments are to be expanded.

2. A tool according to claim 1 including a lower ring positioned in abutment with said upwardly facing shoulder and having an upper rim surrounding and engaging the lower portion of said resilient sleeve, and an upper ring positioned in abutment with said downwardly facing upper shoulder and having a lower rim surrounding and engaging the upper portion of said resilient sleeve.

3. A tool according to claim 1 wherein said segments are arranged to provide a substantially continuous support for said resilient sleeve against the interior of the tubular member being formed by said resilient sleeve.

4. A tool according to claim 1 wherein said segments are formed as though they were cut from said ring along lines which are at an angle substantially less than ninety degrees to a tangent at the point of entry of the cut into the exterior surface of the metal ring.

5. A tool according to claim 4 wherein said segments are formed as though they were cut at an angle of forty degrees to the tangent at the point of entry of the cut into the exterior surface of the metal ring.

6. A tool according to claim 1 wherein the segments are formed as though the cuts through said ring to form said segments are straight cuts.

7. A tool according to claim 1 wherein said means urging the segments radially inward is an annular coil spring.

8. A tool according to claim 7 wherein each of said segments includes a groove cut into its exterior surface, and said annular coil spring is positioned in the grooves in the exterior surface of said segments.

9. A tool according to claim 1 wherein said resilient sleeve is molded on said cylindrical body.

* * * * *